Nov. 18, 1947.   W. RUSH   2,430,996
TIRE EXPANDER
Filed July 10, 1946   2 Sheets-Sheet 1
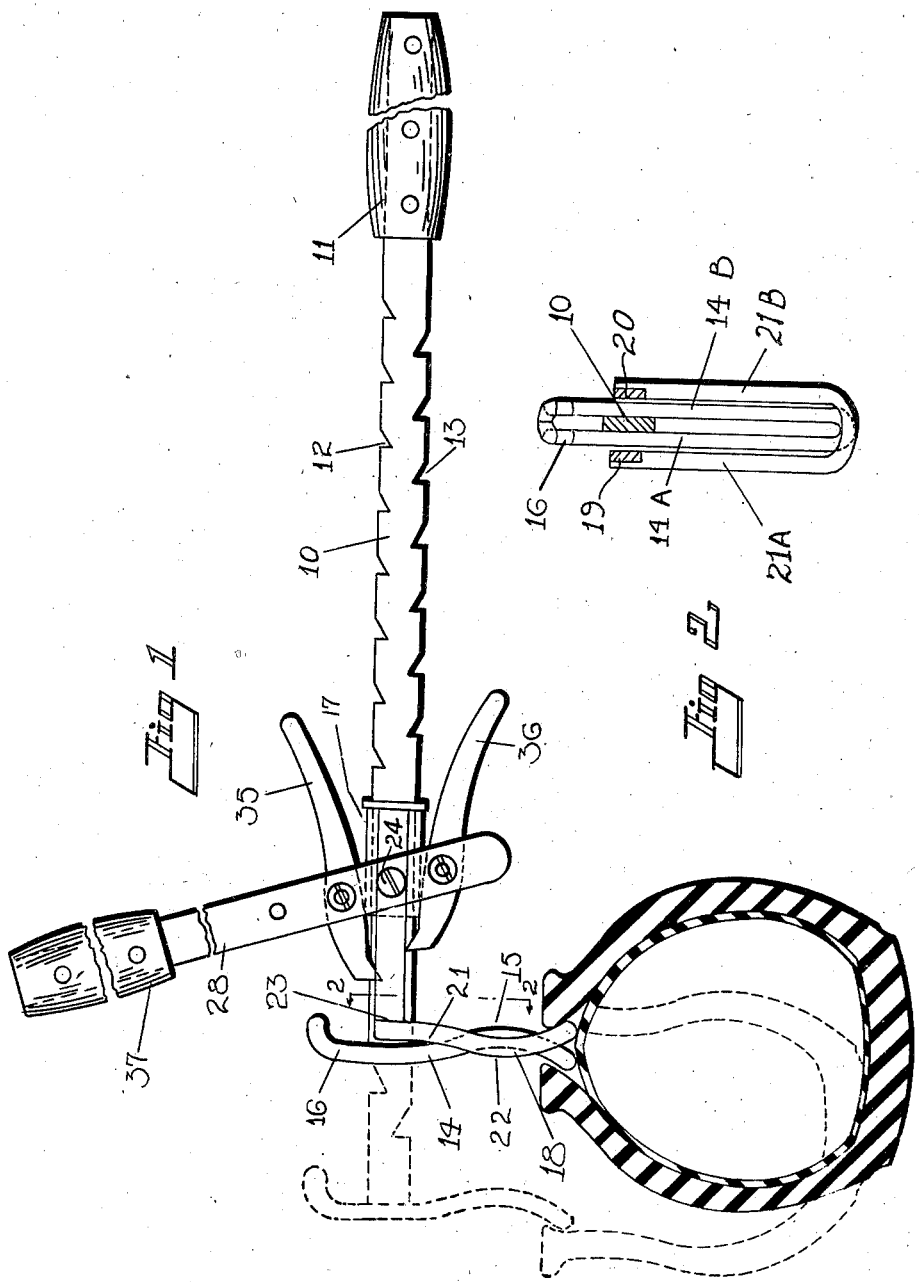
INVENTOR.
WILLIAM RUSH
BY
Smith & Wells

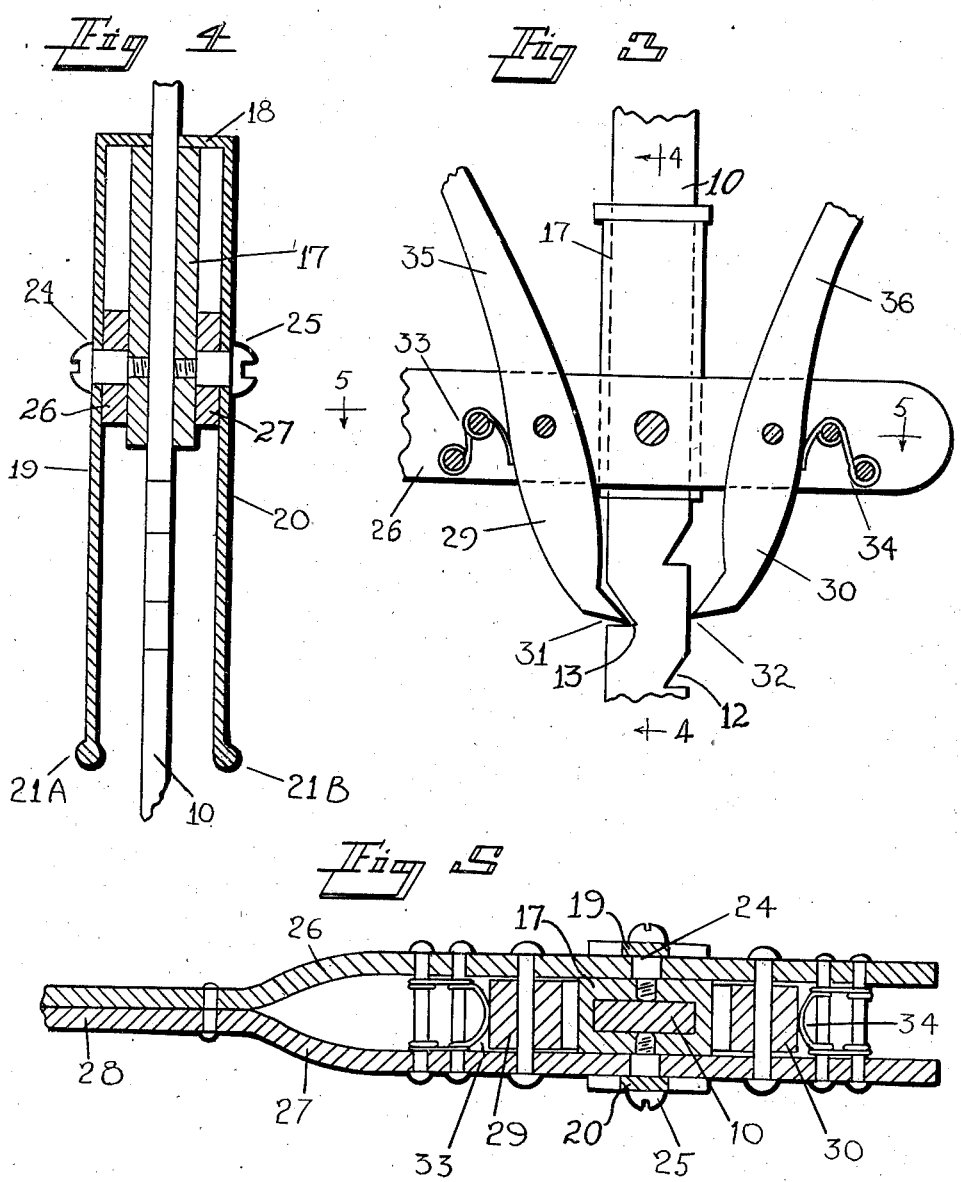

Patented Nov. 18, 1947

2,430,996

UNITED STATES PATENT OFFICE 2,430,996

TIRE EXPANDER

William Rush, Bonners Ferry, Idaho

Application July 10, 1946, Serial No. 682,700

4 Claims. (Cl. 254—50.1)

The present invention relates to improvements in a tire expander.

My invention is particularly applicable to the spreading of tire casings such as are used on trucks and the larger tire casings used on farm tractors and the like. It has the advantage, however, that it may be used on tires of pleasure vehicles and the tire casings can be expanded as much as desired with a minimum loss of time and a minimum obstruction of the space adjacent where the tire is spread so that ready access can be had to the tire tube for removing it or inspecting it. Tire casings often are quite stiff and the casing may also be stuck to the inner tube. With my device, the tire may be expanded at any point in its circumference and after expanding the tire at one point, it is a simple matter to shift to another point for expanding the tire there.

It is the principal purpose of my invention to provide a novel tire expander utilizing a lever and pawl arrangement and embodying hooks at one end of the tool which can be nested to engage in the small space between the beads of any tire, one of the tire engaging hooks being operable by a lever to spread the tire apart as much as desired without projecting anything beyond the other side of the tire.

It is also a purpose of my invention to provide an improved construction of a tire expander whereby the tool is light in weight yet strong enough for all purposes.

The novel features that I consider characteristic of my invention are set forth with particularity in the claims. The invention itself, however, both as to its organization and its method of operation, together with additional objects and advantages thereof, will be understood from the description of a specific embodiment when read in connection with the accompanying drawings, in which:

Figure 1 is a side view of the tire expander showing it applied to a tire;

Figure 2 is a sectional view on the line 2—2 illustrating the construction of the tire expanding hooks;

Figure 3 is a fragmentary sectional view illustrating the mounting on the pawls of the tire expander;

Figure 4 is a fragmentary sectional view taken lengthwise through the tool on the line 4—4 of Figure 3; and Figure 5 is a sectional view taken on the line 5—5 of Figure 3.

Referring now to the drawings, my improved tire expander comprises a jack bar 10 which is rectangular in cross section. This jack bar has a handle 11 mounted on one end thereof and has a series of notches 12 extending along one side edge. A like series of notches 13 extend along the opposite side edge of the bar 10, these notches being staggered with respect to the notches 12. At the end of the bar 10 opposite the handle 11 a hook 14 for engaging the tire is provided. This hook comprises a round rod bent until it is substantially U-shaped, as illustrated best by Figure 2, and curved at 15 intermediate the ends so that the hook faces away from the bar itself. The hook 14 is welded to the end of the bar and has its legs 14A and 14B extended across the bar and curved to provide a hook portion 16 curved toward the handle 11. This hook portion 16 is utilized to hang the tool on a suitable hanger when it is not in use.

A traveling sleeve 17 is slidably mounted on the bar 10 and has fixed thereto a U-shaped member 18 which provides spaced bars 19 and 20 on opposite sides of the bar 10. These bars 19 and 20 have a hook 21 welded to their lower ends, the legs 21A and 21B of the hook being curved as indicated at 22 between their ends so as to provide a hook that faces toward the handle 11 on the jack bar 10. The member 18 is welded to the end of the sleeve at 23 and the bars 19 and 20 are secured intermediate their ends to the sleeve 17 by two screw studs 24 and 25.

The screw studs 24 and 25 also provide pivots for two arms 26 and 27 of a lever 28. The lever 28 as shown best by Figures 3 and 5 has two pawls 29 and 30 pivoted thereon with their tip portions 31 and 32 adapted to engage the notches 12 and 13 of the bar 10. Springs 33 and 34 are mounted on the lever 28 and positioned to press the pawls 29 and 30 against the opposite side edges of the bar 10. The pawls 29 and 30 have extensions 35 and 36 which may be grasped by the hand of the operator to hold the pawls out of engagement with the bar. The lever 28 has a handle 37 at its free end.

The operation of the device in expanding a tire is illustrated in Figure 1 where the tire is shown in full lines before being expanded and in dotted lines after expansion. To apply the tool to the tire, the sleeve is moved out on the jack bar 10, until the hooks 14 and 21 nest as shown in Figure 1 and their tip portions are brought substantially together. In this position the tips can be placed within a tire casing. Then by manipulation of the lever 28 the hook 21 can be moved to the right with respect to the hook 14 until the entire casing is expanded the desired amount. It is a simple matter to release the tool since it is only necessary to grasp the extensions 35 and 36 and hold the pawls away from the notches in the bar 10. The tool has the advantage that the parts are light in weight and yet sufficiently strong to expand any tire. The tool projects only from one side face of the tire so that the tire can be expanded while lying upon a surface such as a floor without any difficulty.

Having thus described my invention, I claim:

1. A tire expander comprising an elongated jack bar having a hand grip on one end and a tire bead engaging hook extending transversely from the bar at its other end, said bar having notches on its opposite side edges staggered with respect to each other, a traveler sleeve having an opening slidably receiving said bar and having bars fixed thereto and extending toward the hook carrying end of the jack bar, said bars having a transversely extending hook fixed thereto at their ends adapted to cooperate with the first named hook in expanding a tire, a lever pivoted on said traveler sleeve, two pawls pivotally mounted on said lever on opposite sides of the sleeve and having notch engaging tips projecting beyond the sleeve toward the hook end of the jack bar, and spring means urging said tips toward the jack bar.

2. A tire expander comprising an elongated jack bar having a band grip on one end and a tire bead engaging hook extending transversely from the bar at its other end, said bar having notches on its opposite side edges staggered with respect to each other, a traveler sleeve having an opening slidably receiving said bar and having bars fixed thereto and extending toward the hook carrying end of the jack bar, said bars having a transversely extending hook fixed thereto at their ends adapted to cooperate with the first named hook in expanding a tire, said hooks comprising U-shaped members with curved leg portions one of which has the leg portions spaced farther apart than the other so the intermediate portions of said legs may overlap in initially engaging the tire beads, a lever pivoted on said traveler sleeve, two pawls pivotally mounted on said lever on opposite sides of the sleeve and having notch engaging tips projecting beyond the sleeve toward the hook end of the jack bar, and spring means urging said tips toward the jack bar.

3. A tire expander comprising an elongated jack bar having a hand grip on one end and a tire bead engaging hook extending transversely from the bar at its other end, said bar having notches on its opposite side edges staggered with respect to each other, a traveler sleeve having an opening slidably receiving said bar and having bars fixed thereto and extending toward the hook carrying end of the jack bar, said bars having a transversely extending hook fixed thereto at their ends adapted to cooperate with the first named hook in expanding a tire, a lever pivoted on said traveler sleeve, two pawls pivotally mounted on said lever on opposite sides of the sleeve and having notch engaging tips projecting beyond the sleeve toward the hook end of the jack bar, and spring means urging said tips toward the jack bar, the jack bar having a second hook opposite to the first named hook and hooked toward the handle end of the bar.

4. A tire expander comprising an elongated jack bar having a hand grip on one end and a tire bead engaging hook extending transversely from the bar at its other end, said bar having notches on its opposite side edges staggered with respect to each other, a traveler sleeve having an opening slidably receiving said bar and having bars fixed thereto and extending toward the hook carrying end of the jack bar, said bars having a transversely extending hook fixed thereto at their ends adapted to cooperate with the first named hook in expanding a tire, a lever pivoted on said traveler sleeve, two pawls pivotally mounted on said lever on opposite sides of the sleeve and having notch engaging tips projecting beyond the sleeve toward the hook end of the jack bar, and spring means urging said tips toward the jack bar, the leg portions of the hook on the jack bar being extended across the bar and beyond it and curved toward the handle end of the jack bar to provide a hook.

WILLIAM RUSH.

REFERENCES CITED

The following references are of record in the file of this patent:

UNITED STATES PATENTS

| Number | Name | Date |
| --- | --- | --- |
| 1,571,376 | Rogers | Feb. 2, 1926 |
| 1,682,632 | Schaeffer | Aug. 28, 1928 |
| 2,042,312 | Huebner | May 26, 1936 |